United States Patent [19]

Williams

[11] 4,256,159

[45] Mar. 17, 1981

[54] METHOD AND APPARATUS FOR MARKING TIRES

[76] Inventor: James H. Williams, R.R. #1, Box 513, Shelbyville, Ind. 46176

[21] Appl. No.: 74,898

[22] Filed: Sep. 12, 1979

[51] Int. Cl.³ .............................................. B60C 13/00
[52] U.S. Cl. ................................ 152/353 R; 156/116; 428/40; 428/79; 428/173
[58] Field of Search .................... 156/116, 110 R, 220, 156/233; 152/330 R, 353 R, DIG. 12; 428/31, 40, 172, 173, 354, 79, 67, 914

[56] References Cited

U.S. PATENT DOCUMENTS

| | | | |
|---|---|---|---|
| 1,371,501 | 3/1921 | McLane | 152/DIG. 12 |
| 1,544,262 | 6/1925 | Midgley | 152/330 R |
| 2,652,496 | 1/1953 | Swift et al. | 428/40 |
| 2,985,216 | 5/1961 | Williams et al. | 152/330 R |
| 3,225,810 | 12/1965 | Enabnit | 152/330 R |
| 3,233,647 | 2/1966 | Newell | 152/330 R |
| 3,449,201 | 6/1969 | Palmquist et al. | 152/353 R |
| 4,125,655 | 11/1978 | Kanzelberger | 428/173 |
| 4,182,393 | 1/1980 | Larson et al. | 156/116 |

*Primary Examiner*—William J. Van Balen
*Attorney, Agent, or Firm*—Woodard, Weikart, Emhardt & Naughton

[57] ABSTRACT

A tire applique comprising a laminate material of first, second and third layers, the first layer being a vulcanizable rubber latex coating or other elastomer, the second layer being a stamping material secured to the first layer, and the third layer being a data material hot stamped to the second layer. The tire applique is vulcanized or otherwise adhered to a tire surface to provide identification material for the tire.

14 Claims, 3 Drawing Figures

METHOD AND APPARATUS FOR MARKING TIRES

BACKGROUND OF THE INVENTION

1. Field of the Invention

The present invention relates primarily to a method and apparatus for applying identifying markings on articles such as vehicle tires, and in particular to an identification applique which may be conveniently applied at a location which facilitates visual inspection.

2. Description of the Prior Art

It is often desirable to provide markings for vehicle tires to discourage unauthorized replacement or transfer thereof, particularly in respect to commercial operation of vehicles. Automobile rental agencies, for example, have particular need for permanently providing each tire on their automobiles which are leased with identification marking. This is true in particular because of the possibility of unauthorized tire interchange or substitution while the automobiles are beyond the agencies control for an extended period. In addition, public service commissions in many states require that trucking companies apply a variety of identifying indicia to trucks and trailers operating across their particular states. These requirements make additionally desirable an inexpensive, convenient means of vehicle marking.

Tire manufacturers supply each tire produced with a serial number, usually with many digits and typically of quite small dimension. These numbers are difficult to read, and may be positioned in a manner that makes the numbers inaccessible for viewing. The present invention provides a method and apparatus for applying identifying markings to articles such as vehicle tires, which provides an attractive and easily read marking.

In my earlier patent, U.S. Pat. No. 2,985,216, issued on May 23, 1961, I disclosed a related method and apparatus for applying markings to vehicle tires. In accordance with that patent, a tire applique was provided which comprised a pad of rubber laminations of contrasting color. Identifying perforations were die cut into the pad laminations to provide the markings. This tire applique was found to be very useful, but is limited in that the amount and types of identifying material which could be included were limited by the die cutting procedure. The present invention overcomes that limitation and permits the use of a great variety of identifying matter to be applied to tires.

In U.S. Pat. No. 1,544,262, issued to Midgley on June 30, 1925, there is disclosed a method for marking rubber. Under the Midgley procedure, the tires are formed with stocks of contrasting shades. Heat is applied to the tire to react upon the rubber mixture to produce a change of shade at this location. Coding devices formed with tires are disclosed in U.S. Pat. Nos. 3,225,810, issued to Enabnit on Dec. 28, 1965, and 3,233,647, issued to Newell on Feb. 8, 1966.

SUMMARY OF THE INVENTION

In a preferred embodiment, the present invention comprises a tire applique having a first elastomeric layer, a second stamping layer secured to the first layer, and a data material layer stamped to the second layer. A backing material mounted to the first layer is removed and the applique is secured to a tire by a suitable adhesive. Other aspects of the present invention relate to the combination of the applique and a tire, and to the process for marking a tire by applying the applique to the tire.

It is an object of the present invention to provide an identification marking for articles such a vehicle tires, which marking is inexpensive and easily applied and becomes a permanent part of the tire.

Another object of the present invention is to provide a tire applique which is conveniently applied to the tire and which may carry a great variety of identifying material and information.

It is a further object of the present invention to provide a tire applique which may be mounted to a tire in a convenient and readily accessible location.

A further object of the present invention is to provide a process for marking tires with identifying material.

Further objects and advantages of the present invention will become apparent from the description of the preferred embodiment which follows.

DESCRIPTION OF THE PREFERRED EMBODIMENT

Figure 2:
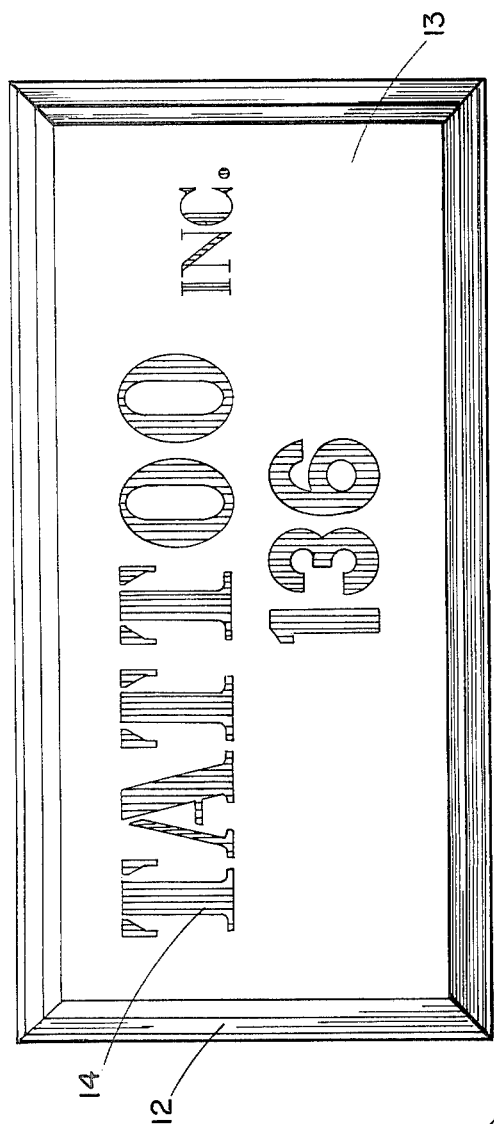
FIG. 2 is a top, plan view of a tire applique constructed in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides an apparatus and method for marking tires with identifying material. Referring in particular to the drawings, there is shown a vehicle tire 10 having secured thereto a tire applique 11 constructed in accordance with the present invention. The tire applique 11 may be applied at any convenient location on the tire 10, and moreover may be applied either before or after the tire is mounted on a vehicle. The applique isformed as a laminate material including several layers. It will be appreciated that additional layers than those described herein may be included in the present tire applique. The first layer 12 of the applique is adapted for securement to the tire surface. The second layer 13 of the applique is secured to the first layer 12, and is adapted for receiving the identifying and informative material which is stamped thereon. The third layer 14 of the applique comprises the identifying or data material which is stamped onto the second layer. Prior to application of the tire applique to a tire, a backing layer 15 is removably secured to the first layer 12.

As indicated, the first layer is adapted for securement to a tire surface, and comprises an elastomeric material. Preferably, the first layer comprises a vulcanizable rubber latex coating, and most preferably comprises uncured, cushioned gum rubber, which provides for securement of the applique to a tire surface. Most suitably, the first layer is vulcanizable within the range of atmospheric temperatures, and in this sense is pressure sensitive.

The first layer of the tire applique is normally covered with a removable layer of Holland cloth 15a, or a similar fabric. The cloth serves the purpose of protecting the raw surface of the first layer prior to use of the applique. The protective cloth is stripped from the first layer just prior to application of the applique to the tire surface. In the process for marking the tire, an area of the outside of the tire wall surface, slightly exceeding the size of the applique, is buffed. The surface is then further prepared by applying a rubber solvent to dissolve a surface layer of the tire, following which the solvent and dissolved rubber are scraped off to leave a substantially non-oxidized surface.

The cloth backing is removed from the first layer of the applique, and the applique is pressed over the prepared surface of the tire. Normal hand pressure is typically sufficient to bring the raw surface into intimate contact with the prepared surface of the tire so as to fix the applique permanently on the tire. However, a tool such as a roller may be employed to insure uniform pressure over the entire surface of the applique. When the applique is so affixed to the tire, the applique becomes vulcanized thereto under atmospheric temperature without any heat otherwise having to be employed. Alternatively, the applique may be applied by removing the cloth backing, applying a suitable adhesive to the tire surface, and pressing the applique onto the adhesive. The latter procedure is considered less desirable, however, since the applique in that instance does not become integrally mounted with the tire surface and is therefore more easily removed without difficulty and without detection.

In accordance with the preferred process for marking a tire, the raw surface of the first layer of the applique is vulcanized to the tire and becomes an integral part thereof. The applique cannot thereafter be removed except by abrading or buffing it away, leaving a tell tale tire surface indicating the removal.

The applique preferably has its margins beveled to prevent scuffing of the applied material when the tire scrapes against curbs and the like. The beveled surface also gives the applique a more attractive appearance. In addition, the several layers of the applique may be provided in contrasting colors, and the bevel then provides a conspicuous outline for the applique which is both attractive and more easily located.

The second layer of the applique comprises a stamping material secured to the first layer, typically by vulcanization therewith. Again, the integral connection, as by vulcanizing, between the several layers of the applique provides further assurance that the applique will remain intact, and will be difficult to remove without detection. The second layer of material is sized at a sufficient depth to receive the third layer of material which is stamped thereon. The second layer preferably comprises an elastomeric material, and may suitably consist of an elastomer or synthetic rubber. Natural rubber may be used as the second layer, but is considered less desirable since it does not receive hot stamping of the third layer as well as synthetic rubber or other elastomers. Preferably, the second layer comprises synthetic rubber or a plastic material, and a preferred material for the second layer is Norsorex polynorbornene, available from the American Cyanamid Company, Boundbrook, N.J. 08805.

The third layer of the tire applique comprises a data material stamped to the second layer. The data material layer may comprise a variety of materials capable of being stamped to the second layer, as known in the art, and is most desirably a foil leaf material. In further preference, the data material is hot stamped to the second layer, which is particularly desirable for a third layer comprising a foil leaf material.

Figure 3:
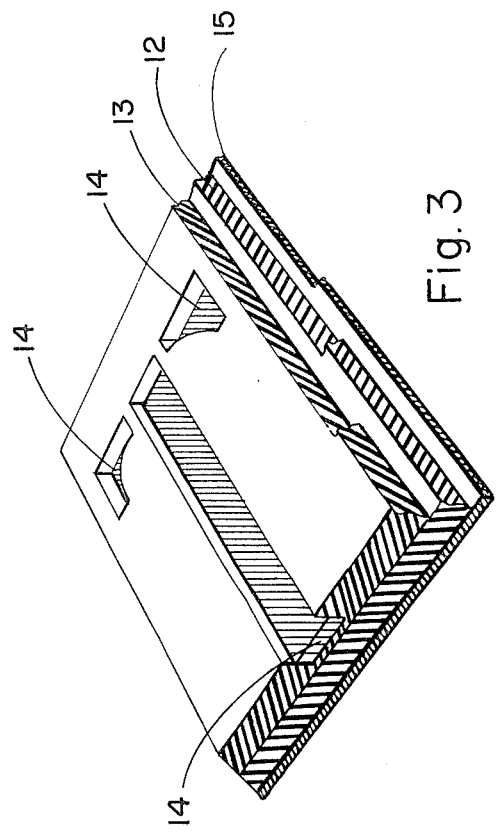
FIG. 3 is a side, perspective, cross-sectional view of a portion of the tire applique of FIG. 2.
Figure 1:
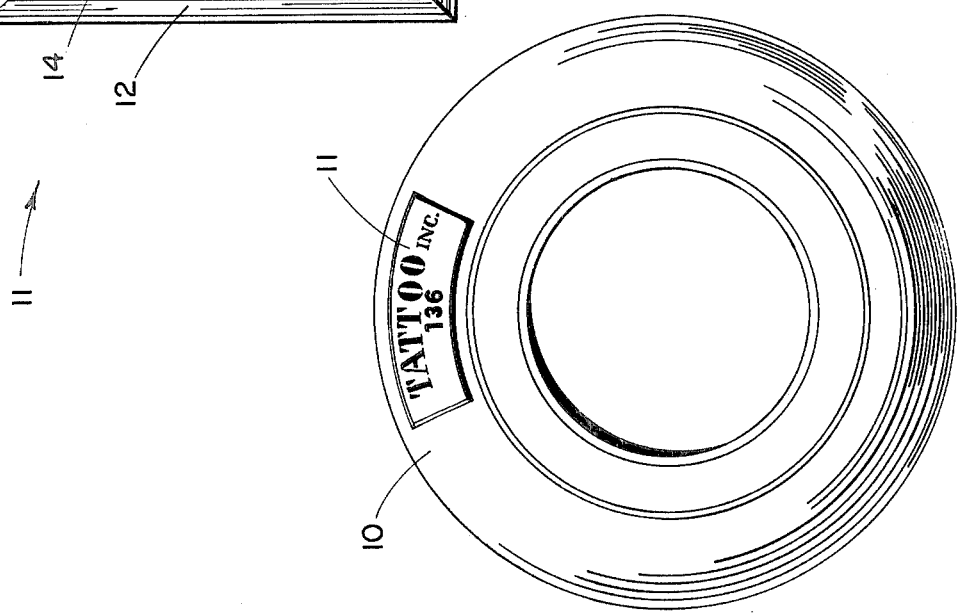
FIG. 1 is a side, elevational view of a tire having mounted thereon a tire applique constructed in accordance with the present invention.

The stamping process is well understood in the art, and equipment particularly suited for the procedure is readily available such as from Kensol-Osenmark, Inc., 40 Melville Park Road, Melville, N.Y. 11746. In the preferred hot stamping procedure, the stamping die is mounted in a heated head of a press. The tire applique is positioned on the work table of the press directly below the die. The leaf material is positioned between the die and the applique. When the die is brought into contact with the applique under pressure, the heat transfers the leaf material into depressions (FIG. 3) made in the applique by the die. In this manner, the tire applique may be produced with a great variety of designs and informational data being provided. For example, identifying numbers may be combined with various trademarks, trade names, logos and other words or designs to provide an attractive and informative marking for the tires and the like. Various colors and combinations may be employed in preparing the tire applique.

The tire applique of the present invention is both attractive and informative. The applique will withstand rough treatment of a type which truck tires typically receive in use. The applique is low in cost, and is readily applied to a tire in any desired location. The applique would typically have sizes in the range of 1 inch by 3 inches, $1\frac{3}{8}$ inches by $2\frac{3}{4}$ inches, or 1 inch by 1 inch.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tire applique which comprises a laminate material including at least first, second and third layers arranged consecutively, the first layer comprising a vulcanizable rubber latex coating providing for a securement of said applique to a tire surface at a selected location, the second layer comprising a stamping material secured to the first layer and including depressions, and the third layer comprising a data material received within the depressions in the second layer, whereby mounting of said applique to a tire surface provides a marking of the tire with desired data.

2. The tire applique of claim 1 in which the first layer comprises uncured, cushion gum rubber.

3. The tire applique of claim 1 in which the second layer comprises an elastomeric material.

4. The tire applique of claim 1 and which further includes a backing layer removably secured to the first layer of said laminate material.

5. The tire applique of claim 1 in which the third layer comprises a foil leaf material hot stamped into the second layer.

6. The tire applique of claim 5 in which the second layer comprises an elastomeric material.

7. The tire applique of claim 6 in which the first layer comprises uncured, cushion gum rubber.

8. A combination of a tire and a tire applique which comprises:
- a tire having a surface;
- a laminate material secured to the surface of said tire; and
- means for securing said laminate material to the surface of said tire;
- said laminate material including at least first, second and third layers arranged consecutively, the first layer comprising an elastomeric material adapted for securement to the tire surface, the second layer comprising a stamping material secured to the first layer and including depressions, and the third layer comprising a data material received within the depressions in the second layer, whereby mounting of said applique to a tire surface provides a marking of the tire with desired data.

9. The combination of claim 8 in which the third layer of said laminate material comprises a foil leaf material hot stamped to the second layer.

10. The combination of claim 9 in which the first layer comprises a vulcanizable rubber latex coating.

11. A process for marking a tire which comprises:
- a. providing a laminate material including at least first, second and third layers arranged consecutively, the first layer comprising an elastomeric material adapted for securement of the tire surface, the second layer comprising a stamping material secured to the first layer and including depressions, and the third layer comprising a data material received within the depressions in the second layer, whereby mounting of said laminate material to a tire surface provides a marking of the tire with desired data;
- b. buffing the tire surface;
- c. applying a suitable solvent to the tire surface; and
- d. pressing the first layer of the laminate material onto the prepared surface of the tire.

12. The process of claim 11 in which the data material of the third layer is hot stamped onto the stamping material of the second layer.

13. The process of claim 12 in which the data material comprises a foil leaf material hot stamped to the second layer.

14. The process of claim 11 in which step a. comprises providing a laminate material including a backing layer secured to the first layer, the process further including, prior to step d. the step of removing the backing layer from the first layer.

* * * * *